Figure 1:
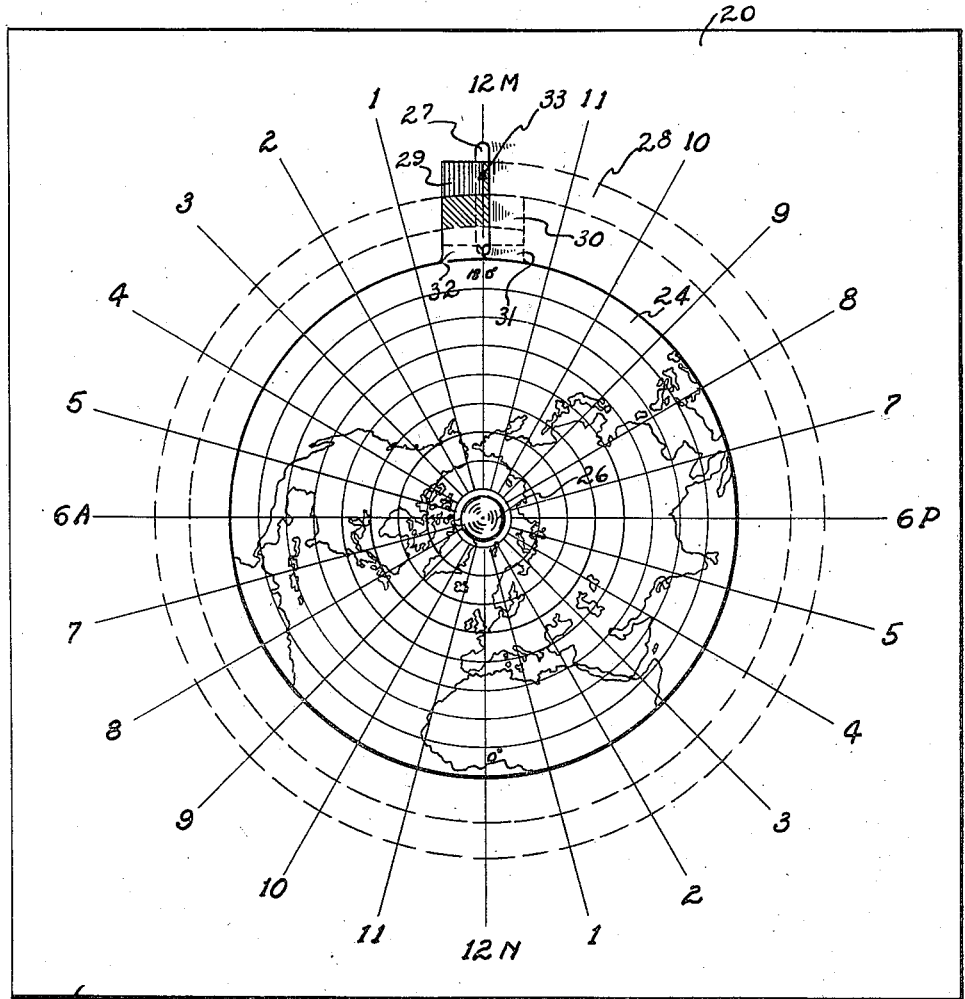

April 8, 1947. W. C. CHRISTY 2,418,756
EDUCATIONAL DEVICE
Filed Oct. 10, 1945 2 Sheets-Sheet 1

INVENTOR.
WILLIAM C. CHRISTY
BY Benedict & Swartwood
ATTORNEYS

April 8, 1947.    W. C. CHRISTY    2,418,756
EDUCATIONAL DEVICE
Filed Oct. 10, 1945    2 Sheets-Sheet 2

INVENTOR.
WILLIAM C. CHRISTY
BY Benedict & Swartwood
ATTORNEYS

Patented Apr. 8, 1947

2,418,756

UNITED STATES PATENT OFFICE 2,418,756

EDUCATIONAL DEVICE

William C. Christy, Danville, Ill.

Application October 10, 1945, Serial No. 621,549

7 Claims. (Cl. 35—44)

1

The invention relates to a device to be used for computing longitude and time on various parts of the earth's surface and as an adjunct to teaching dates, time, longitude, and other problems related thereto. More particularly, it relates to a device for teaching and solving problems relating to the change of time and date due to the earth's revolution.

Teaching the concept of difference in time and of change of date at different points on the earth is often difficult because it is hard for many people to grasp the concept, particularly pupils in the elementary and high schools where the subject is first encountered. It is an object of this invention to simplify teaching methods relating to time, date, etc., by means of a mechanical device illustrating visually the passage of time, the relationship of date changes and computing of time at different points on the earth. These are subjects which, largely due to the development of aviation, have become of major interest to people throughout the world.

The device herein discussed is one which may be kept in a desk drawer or home or may be used in enlarged form, for example in the schoolroom for lecture purposes.

In one specific embodiment, the invention comprises a base, preferably having a plane surface with radial lines corresponding to the hours of the day or if desired the degrees of longitude intersecting at a central point, a hole serving as a bearing located at the point of intersection, a slot spaced from the central point and preferably located adjacent an edge, said slot disposed upon and coinciding to one of said radial lines, a pair of disks disposed on either side of the base, said disks being circular in form and having a polar projected map of the Northern Hemisphere on one disk and the Southern Hemisphere on the other, lines of longitude inscribed on the disks, the perimeter of said disks corresponds to the equator and the point of intersection corresponding to the geographic poles, said disks supported and rigidly joined together by a bearing journaled in the hole in the base, means, preferably a knurled knob, for turning the disks, each disk having a radially projecting ear comprising an extension of the disk corresponding to the 180th meridian of the maps and including the international date line, said ears being juxtapositioned and attached to a spiral spaced from the disks and passing through the slot so that a greater or lesser amount of the spiral appears or disappears through the slot as the disks are rotated.

2

Figure 5:
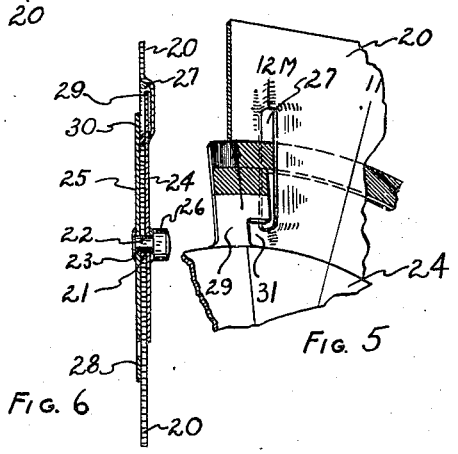
Figure 6:
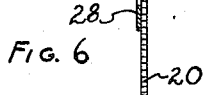
Figure 4:
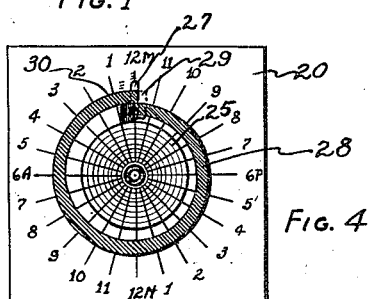
Figure 2:
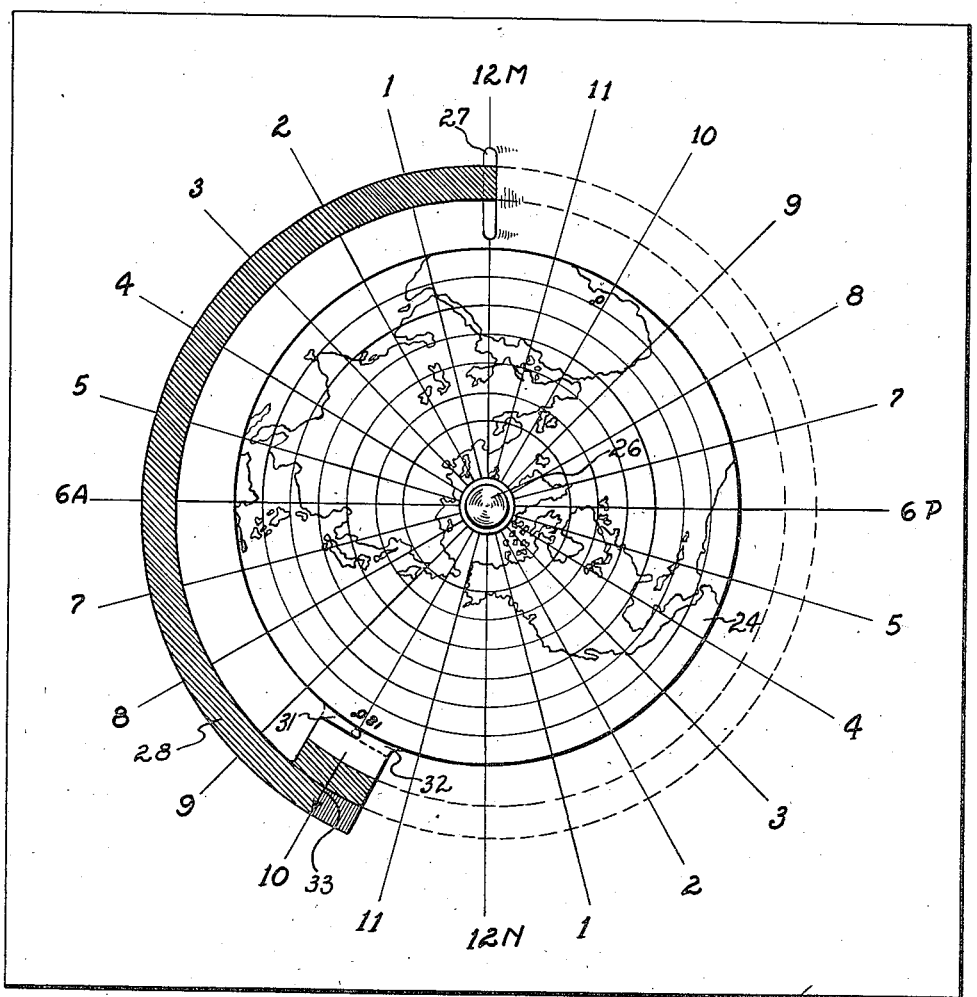
Figure 3:
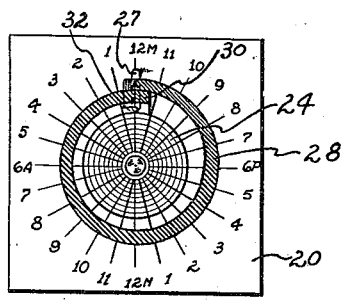

Figure 1 shows the Northen Hemisphere side of the device which is in starting position with the 180th meridian or international date line corresponding to 12 o'clock midnight. Figure 2 shows the same side of the device with the map rotated until the 180th meridian corresponds to 10 a. m. Figure 3 illustrates the device rotated a full 360° from the position shown in Figure 1 indicating one revolution of the earth, or the passage of one day. The map was left off for purposes of simplification. Figure 4 shows the reverse side of the device when in the position as shown in Figure 1. The Southern Hemisphere would be placed on this side but was omitted for purposes of simplification. Figure 5 is a detail of the device showing a construction of the slot and the relation of the ear and spiral. Figure 6 is a sectional side view of the device showing the relationship of the various parts assembled when in the position illustrated in Figure 1.

Refer to Figure 1. A base 20 is made of sheet material such as metal, cardboard, plastic, fibre board, etc., and may be square, circular, or of any other desired shape. It may contain additional information such as instructions for operating the device or geographic information regarding the map, etc. When it is to be used in the large model, it may comprise means for supporting it such as an easel or a hole for hanging it on the wall, etc. On base 20 are radial lines which are numbered to correspond to the hours of the day and night. They may also or alternatively have the degrees of longitude inscribed thereon since they correspond to lines of longitude. They preferably describe a 15° angle so that each represents one hour. In the center of base 20 is a hole 21 (see Figure 6) in which is journaled a bearing 22, serving as a pivot point. The edges of the hole may be the bearing surface or an eyelet or sleeve may be added if desired. This bearing 22 has a crimped end 23 which fastens it rigidly to the map dials 24 and 25. If needed, it may be welded, soldered, glued or otherwise held in place. One end preferably has a knurled knob 26 by which the map dials may be rotated. A slot 27 is cut in the base spaced from the center pivot point. This may be offset slightly as indicated in Figures 5 and 6 in order to permit the free passage of spiral 28 therethrough. On each of the map dials are ears 29 and 30 attached to or integral with dials 24 and 25 respectively and juxtaposed. The ear 29 may be notched at 31 and the ear 30 may contain a notch 32 to permit part of the ear to pass behind the base plate through the slot. This allows the arrow 33 to be brought into correspondence exactly with the lines representing 12 midnight on the base and the 180th meridian when the dials are turned into the starting position. A similar slot 32 in ear 30 permits the arrow on the opposite ear to coincide with the midnight line when the dial has been completely rotated. The ear 29 is attached to one end of spiral 28 at a point remote from the center of the map dial. The ear 30 is attached to the opposite end of spiral 28 at a point spaced inwardly from the point at which the spiral is attached to ear 29, so that it forms one complete loop of a continuous spiral as illustrated, particularly in Figure 1.

Referring to Figure 1, a polar projection of the Northern Hemisphere is sketched upon the map dial 24. The device is shown in the starting position with the arrow 33 pointing to 12 midnight. The spiral 28 is preferably colored in order to make the teaching illustration more vivid. The line of longitude on the dial or disk is the 180th meridian which corresponds roughly to the international date line. If desired, the international date line can be drawn in although this was not done here for purposes of simplifying the illustration. In order to operate the device (refer to Fig. 1) the knurled knob 26 is turned in a counter-clockwise direction. The colored spiral 28 begins to appear through slot 27 indicating the appearance of a new day. As the knob is turned the map dial rotates corresponding to the rotation of the earth. With each 15° of revolution, the new day becomes one hour older. Thus the age of the new day can be determined by merely observing the position of arrow 33 in relation to the hours numbered on base 20. Since the arrow lies on the international date line, this means that all of the territory within the lines of longitude crossed by the colored spiral lie in the new day and the territory between the lines not crossed by the spiral is in the preceding day. Thus in Figure 2, the new day is ten hours old while the preceding day has fourteen hours to go. When the dial has been turned a full 360° so that it lies in the position shown in Figure 3, a full 24 hour day has passed. Insofar as territory lying on the international date line is concerned another day is about to begin. If the spiral could be continued it could be shown how the third day develops. Instead of this, the dial is turned back to the starting point and the passage of time is illustrated by repeating the operation just performed.

To illustrate this specifically, let us assume that Figure 1 refers to 12 o'clock midnight of January 1. As the knob 26 is turned to the position illustrated in Figure 2, time (figuratively) passes and the new day, January 1, becomes older and older until it reaches the position shown, namely 10 a. m., of January 1, on the international date line. The portion of the globe lying between the point marked 12 M., which passes roughly through Moscow, Russia, and the international date line indicated by the arrow at 10 A. is in the first day of the new year. The lines of longitude included are crossed by the colored spiral. All of the portion of the globe lying in meridians not crossed by the spiral, i. e., extending from 10 a. m. to midnight in counter-clockwise direction, lies in the old year and the date is December 31. When the rotation of the dial is continued to the position shown in Figure 3 the arrow again points to 12 M. (midnight). At that instant just before the new day, January 2, begins the date throughout the world is January 1. In order to continue the operation, the knob is now turned backward in a clockwise direction until it is again in the position of Figure 1. At the instant before the dial is again turned in a counter-clockwise position, the date in the whole world is January 1. As the knob is turned in a counter-clockwise direction, the day January 2 begins to appear and the day January 1 begins to disappear.

It will be noted that when the device as shown in Figure 1 is turned completely over as shown in Figure 4, that the spiral 28 coming through the slot coincides with the colored band 33 on ear 29, lying below the juncture of the spiral and ear 29 so as to indicate continuity at the completion of one revolution of the earth, i. e. the passage of one day.

A similar showing can be made for the Southern Hemisphere by turning the dial over. Figure 4 shows the dial in the same position it is in Figure 1. For purposes of simplification the Southern Hemisphere is not illustrated. In order to illustrate the passage of time in the Southern Hemisphere, it would be necessary to turn the dial as shown in Figure 4, 360° clockwise to the starting position. Otherwise the operation becomes the same as described with reference to the Northern Hemisphere.

The apparatus has the advantage over other types of teaching device intended for a similar purpose, in that it visually illustrates the passage of the new day by the appearance of a colored spiral corresponding to the extent of rotation of the earth about its axis, this spiral crossing only the radial meridian lines of the territory in which the day has dawned, but not hiding the territory.

It can be used to compute time at the various points on the earth's surface by turning the dial until the desired point on the map rests on the line corresponding to the desired hour. The unknown point is then located on the map and the hour can be read by referring to the numbers on the base. For example, referring to Figure 2, the time in Chicago might be 4 p. m. of December 31 and it is desired to know the date and time in Tokyo. The dial is set so that the meridian passing through Chicago corresponds to 4 p. m. on the base and it is then found that the meridian passing approximately through Tokyo is at 7 a. m. of January 1, 1945. We know this because the colored spiral lies across the meridian which passes through Tokyo. In a similar manner, it can be determined that the time in London is approximately 10 p. m. of December 31, 1944 since the meridian passing through that point is not covered by the spiral and the hour indicated on the base is 10 p. m. To determine the time at a point in the Southern Hemisphere with reference to a point above the equator, the known hour is set as described and the device turned over without changing the dial setting. The unknown point is then located and the unknown time read from the numbered base.

It is possible for the numbering to be in units of 24 hours to correspond to the 24 hour clock rather than the 12 hour clock as was illustrated. Airline routes, steamship routes, etc., may be marked on the maps for use in home, office, schools, in connection with travel agencies, etc.

A preferred embodiment of the device is illustrated but is not intended to unduly limit the invention.

I claim as my invention:

1. An educational device comprising a plane surface base having therein journaling means for a bearing, a radial slot spaced therefrom, dials mounted for rotation in unison on opposite sides of the base, each dial having thereon a polar projected map of one hemisphere, the Northern Hemisphere being on one and the Southern Hemisphere on the other dial, said maps including lines of longitude, the perimeter of said dials corresponding to the equator, a bearing journaled in the said journaling means and attached to each dial, identifying numbers on said base corresponding to the hours of the day or lines of longitude, said slot lying radially on one of said lines, means associated with the dials for rotating them in unison, an ear attached to each of said dials and extending radially therefrom along a line corresponding to the 180th meridian, a member distinguishable in appearance from said base forming a loop of a spiral passing through said slot spaced from said map dials, one end being attached to the ear of one dial and the other end to the other ear.

2. A device for computing time and longitude which comprises a base having parallel sides, journaling means for a bearing disposed in the base, a map dial or disk on each side of the base and parallel thereto, one of which has a polar projected map of the Northern Hemisphere of the earth and the other a polar projected map of the Southern Hemisphere of the earth, the perimeter of said dials corresponding to the equator, said dials being mounted for rotation on the base by bearing means operatively associated with said journal means, a radial slot spaced from the journal means and from the dials, lines corresponding to the meridians on said dials and on said base, identifying numbers for the lines on the base, said slot lying radially on one of the lines on said base, means for rotating the dials in unison, an ear on each of said dials extending radially therefrom, a member distinguishable in appearance from said base forming the loop of a spiral spaced from said map dials and attached at either end to one of said ears on opposite sides of the base, said member passing through said slot.

3. A device for computing time and longitude which comprises a base having parallel sides, a map dial on each side of the base and parallel thereto, one of which has a polar projected map of the Northern Hemisphere of the earth and the other a polar projected map of the Southern Hemisphere of the earth, the perimeter of said dials corresponding to the equator, said dials being mounted for rotation in unison on the base, a radial slot spaced from the dials, lines corresponding to the meridians on said dials and on said base, identifying numbers on the base corresponding to the lines, said slot lying radially on one of said lines, means for rotating the dials, an ear on each of said dials extending radially therefrom and juxtaposed, a member distinguishable in appearance from said base forming a loop of a spiral spaced from said map dials and attached at either end to one of said ears on opposite sides of the base, said spiral passing through said slot, notches in said ears adjacent the dial to permit a portion of the ear to pass through said slot so that a radially indexed line on the ear can coincide with a meridian line when the dial is completely rotated in either direction.

4. A device comprising a plane sided base, a pair of dials rotatably mounted one on each side of the base, a polar projected map of the Northern Hemisphere on one dial and of the Southern Hemisphere on the other, the equator lying on the perimeter of the dial, radially projecting ears on each dial in juxtaposition to each other, a member distinguishable in appearance from said base forming a loop of a spiral extending through a radial slot spaced from the dial, one end of said member being attached to one of the dials and the other end attached to the other dial, lines of longitude extending radially on the dial and the base, and means for rotating the dials in unison.

5. An educational device for teaching and computing time, dates, and the like which comprises a base having plane surfaces with radial lines corresponding to lines of longitude intersecting at a point, dials mounted on the base to rotate in unison about the point of intersection, a slot spaced from said point, said slot coinciding with one of said radial lines, a pair of dials disposed on either side of the base having a polar projected map of the Northern Hemisphere on one dial and the Southern Hemisphere on the other dial, lines of longitude inscribed on the dials, the perimeter of said dials corresponding to the equator and the point of intersection corresponding to the geographic poles, said dials being supported on the base and mounted to be simultaneously rotated, means for rotating the dials, a radially projecting ear on each of said dials coinciding with a meridian on the map, and a member distinguishable in appearance from said base forming a loop of a spiral passing through said slot and attached at each end to said ears.

6. A device comprising a base, a pair of dials mounted on opposite sides of the base, means for rotating said dials in unison, a polar projected map of one hemisphere on one dial and of the other hemisphere on the other dial, a member distinguishable in appearance from said base forming a loop of a spiral, said member extending through a radial slot in said base spaced from the dial, one end of said member being attached to one of the dials and the other end attached to the other dial on the opposite side of the base so that rotation of the dials to the position indicated in one hemisphere will indicate the corresponding condition in the other hemisphere, and lines of longitude extending radially on the dials and the base.

7. A device comprising a base, a first member mounted on one side of the base, a second member mounted on the opposite side of the base, means for rotating said members in unison, a polar projected map on said member, a device comprising a loop of a spiral distinguishable in appearance from said base, said device extending through an opening in said base, said device being attached terminally to said first and second members to permit movement of said spiral through said slot during one complete revolution of said members, and lines of longitude extending radially on said members and on the base.

WILLIAM C. CHRISTY.

REFERENCES CITED

The following references are of record in the file of this patent:

UNITED STATES PATENTS

| Number | Name | Date |
| --- | --- | --- |
| 2,039,921 | Murphy | May 5, 1936 |
| 1,539,868 | Roberts | June 2, 1925 |
| 680,018 | Brake | Aug. 6, 1901 |
| 791,709 | Meili | June 6, 1905 |
| 776,297 | Cordeiro | Nov. 29, 1904 |
| 1,836,643 | Chesham | Dec. 15, 1931 |